United States Patent [19]

Noda et al.

[11] Patent Number: 5,268,243

[45] Date of Patent: Dec. 7, 1993

[54] GALVANIC CELL

[75] Inventors: Tomohiko Noda, Takatsuki; Shyuiti Izuti, Shiga; Hiroshi Imachi; Kenji Motogami, both of Takatsuki; Shigeo Mori, Kyoto, all of Japan

[73] Assignee: Dai-Ichi Kogyo Seiyaku Co., Ltd., Kyoto, Japan

[21] Appl. No.: 938,614

[22] Filed: Sep. 1, 1992

[51] Int. Cl.$^5$ .............................................. H01M 6/18
[52] U.S. Cl. ........................................ 429/192; 429/33; 429/218; 252/62.2
[58] Field of Search ............... 429/192, 33, 27, 101, 429/218, 213; 252/62.2, 518, 182.1; 204/421

[56] References Cited

U.S. PATENT DOCUMENTS

| | | | |
|---|---|---|---|
| 4,020,944 | 11/1986 | Armand et al. | 252/518 |
| 5,051,211 | 9/1991 | Ward et al. | 252/518 |
| 5,098,589 | 3/1992 | Motogami et al. | 429/192 X |

FOREIGN PATENT DOCUMENTS

| | | |
|---|---|---|
| 078505A1 | 10/1982 | European Pat. Off. . |
| 145498A3 | 12/1984 | European Pat. Off. . |
| 174894A1 | 9/1985 | European Pat. Off. . |
| 331342A2 | 2/1989 | European Pat. Off. . |
| 62-249361 | 10/1987 | Japan . |
| 4-36347 | 2/1992 | Japan . |

OTHER PUBLICATIONS

British Polymer Journal, vol. 20, No. 3 (1988) pp. 253–268.

Primary Examiner—Anthony Skapars
Attorney, Agent, or Firm—Morgan & Finnegan

[57] ABSTRACT

At least one of the negative electrode, the positive electrode and the separator in the galvanic cell comprises a solid electrolyte prepared by doping an ionic compound to an organic polymer. The organic polymer is a polymer obtained by crosslinking an organic compound having a structure of the general formula (I):

$$Z\text{-}[E\text{-}Y]_k \qquad (I)$$

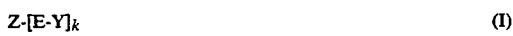

where Z is a residue of a compound containing at least one active hydrogen, Y is an active hydrogen or a polymerizable functional group, E is expressed by $-(A)_m-$ or a block-copolymeric type group of the above A and $-(CH_2-CH-O)-$ in which the total sum of A is m and the total sum of $-(CH_2-CH-O)-$ is p, m is an integer of 1 to 250, p is an integer of 1 to 450, k is an integer of 1 to 12, and A is a group represented by the general formula (II):

$$-(CH_2-CH-O)- \qquad (II)$$
$$\mid$$
$$CH_2-O-(CH_2-CH_2-O)_nR$$

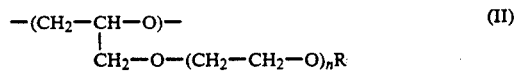

where n is an integer of 1 to 25 and R is an alkyl group having 1 to 20 carbon atoms, an alkenyl group, an aryl group or an alkylaryl group.

7 Claims, 2 Drawing Sheets

GALVANIC CELL

BACKGROUND OF THE INVENTION

The present invention relates to a galvanic cell using a solid electrolyte.

A liquid electrolyte has been used as the electrolyte for conventional galvanic cells. However, it caused leakage of the liquid and had problems in long-term reliability and stability.

The solid electrolyte has been investigated considering this point of view. $\beta$-alumina, lithium iodide and copper rubidium, etc. have been known as the solid electrolytes. However, they have problems in moldability and film-forming property.

Hence, various investigations have been carried out on the organic solid electrolyte which can solve the problems in moldability and film-forming property. For example, there has been known the following organic solid electrolytes: an organic polymer electrolyte of polyethylene oxide (PEO) type; an organic polymer electrolyte having a multifunctional polyether molecular structure prepared by a random copolymerization of ethylene oxide portion and propylene oxide portion (Japanese Laid-Open Patent Publication No. 249,361 of 1987); a solid polymer electrolyte comprising an ethylene oxide copolymer containing an ionic compound in dissolved state (Japanese Laid-Open Patent Publication No. 83,249 of 1986); and an ion-conductive polymer electrolyte in which a high polymer solid substance having plasticity is further constituted substantially with a branched-chain of a homopolymer or copolymer which is thermoplastic and has no crosslinkage (Japanese Laid-Open Patent Publication No. 98,480 of 1980).

However, in a straight chain PEO, crystallization of PEO occurs at a temperature lower than its melting point to lower the ionic conductivity suddenly. In the other polymer electrolytes, though the conductivity at room temperature of about 25° C. is improved by the inhibition of crystallization, no sufficient conductivity usable in a galvanic cell can be attained at a temperature lower than it and especially an extreme decrease in conductivity is observed at 5° C. or lower.

An object of the present invention is to provide a galvanic cell which eliminates the above problems and can be used stably at a low temperature and has an improved low temperature characteristics.

SUMMARY OF THE INVENTION

The galvanic cell according to the present invention is in which at least one of the negative electrode, the positive electrode and the separator comprises a solid electrolyte prepared by doping an ionic compound to an organic polymer. The organic polymer is a polymer obtained by crosslinking an organic compound having a structure of the general formula (I):

$$Z\text{-}[E\text{-}Y]_k \qquad (I)$$

where Z is a residue of a compound containing at least one active hydrogen, Y is an active hydrogen or a polymerizable functional group, E is expressed by —(A)$_m$— or a block-copolymeric type group of the above A and —(CH$_2$—CH—O)— in which the total sum of A is m and the total sum of —(CH$_2$—CH—O)— is p, m is an integer of 1 to 250, p is an integer of 1 to 450, k is an integer of 1 to 12, and A is a group represented by the general formula (II):

$$-(CH_2-CH-O)- \qquad (II)$$
$$\quad\quad\quad | $$
$$\quad CH_2-O-(CH_2-CH_2-O)_nR$$

where n is an integer of 1 to 25 and R is an alkyl group having 1 to 20 carbon atoms, an alkenyl group, an aryl group or an alkylaryl group.

Furthermore, the present invention include also a lithium cell containing a substance which can dissolve the ionic salt in the solid electrolyte portion as mentioned above.

DETAILED DESCRIPTION OF THE INVENTION

The organic compound of the general formula (I) used as the raw material for the organic polymer of such solid electrolyte is a polyether compound prepared by reacting an active hydrogen compound with a glycidyl ether alone or a glycidyl ether and ethylene oxide, or a compound prepared by reacting an additional compound containing a reactive functional group with the above polyether compound to introduce a reactive functional group to the active hydrogen group at the end of the main chain of ethylene oxide. Generally, it is preferred that the average molecular weight of the organic compound is not more than 20,000.

The above-mentioned active hydrogen compounds include, for example, monoalcohol such as methanol and ethanol; polyhydric alcohols such as ethylene glycol, propylene glycol, 1,4-butanediol, glycerol, trimethylolpropane, sorbitol, sucrose and polyglycerol; amine compounds such as butylamine, 2-ethylhexylamine, ethylenediamine, hexamethylenediamine, diethylenetriamine, triethylenetetramine, tetraethylenepentamine, pentaethylenehxamine, aniline, benzylamine and phenylenediamine; phenolic active hydrogen compounds such as bisphenol A, hydroquinone and novolac; and compounds having different active hydrogen groups in a molecule such as monoethanolamine and diethanolamine. Among them, polyhydric alcohols are particularly preferred.

As the glycidyl ethers to be reacted with the active hydrogen compound, there are exemplified the following compounds; such as alkyl-, alkenyl-, aryl- or alkylaryl-polyethylene glycol glycidyl ethers represented by the following formula:

$$CH_2-CH-CH_2-O-(CH_2-CH_2-O)_n-R$$
$$\quad\backslash\quad/$$
$$\quad\quad O$$

where n is an integer of 0 to 25 and R is an alkyl group having 1 to 20 carbon atoms, an alkenyl group, an aryl group or an alkylaryl group. Typical compounds include, for example, those in which R is a straight chain alkyl group such as methyl group, ethyl group and butyl group; a branched chain alkyl group such as isopropyl group, sec-butyl group and tert-butyl group; an alkenyl group such as vinyl group, allyl group, 1-propenyl group and 1,3-butadienyl group; and an aryl or an alkylaryl group such as phenyl group, nonylphenyl group, tolyl group and benzyl group. Among them, those in which n is an integer of 1 to 15 and R has 1 to 12 carbon atoms is especially preferred.

The catalysts usable in the reaction include in general basic catalysts such as sodium methylate, sodium hydroxide, potassium hydroxide and lithium carbonate and also useful are acidic catalysts such as boron trifluoride and amine catalysts such as trimethylamine and triethylamine. The amount of the catalyst used is optional.

As mentioned above, the organic compound used in the present invention may be a compound in which a glycidyl ether alone is combined to an active hydrogen compound or a compound in which a glycidyl ether is block copolymerized together with ethylene oxide. In both cases, the molar number of the glycidyl ether added is preferably 1 to 250 moles per active hydrogen of the active hydrogen compound. The molar number of ethylene oxide block copolymerized together with the glycidyl ether is preferably 1 to 450 moles per active hydrogen mentioned above. In the case a glycidyl ether is block copolymerized together with ethylene oxide, there is no special restriction on their mutual positions and the number of blocks. However, the molar number to be added is preferably selected properly so that the average molecular weight of the organic compound does not exceed 20,000.

Crosslinking of such organic compounds is carried out by using a crosslinking agent when the terminal group Y of the main chain is an active hydrogen group.

Useful crosslinking agents include, for example, tolylene 2,4-diisocyanate (2,4-TDI), tolylene 2,6-diisocyanate (2,6-TDI), diphenylmethane 4,4'-diisocyanate (MDI), hexamethylene diisocyanate (HMDI), isophorone diisocyanate, triphenylmethane diisocyanate, tris-(isocyanatephenyl)thiophosphate, lysine ester triisocyanate, 1,8-diisocyanate-4-isocyanatemethyloctane, undecane 1,6,11-triisocyanate, hexamethylene 1,3,6-triisocyanate, bicycloheptane triisocyanate, buret-bonded HMDI, isocyanurate-bonded-HMDI, an adduct of trimethylolpropane with 3 moles of TDI, and the mixture thereof.

When an isocyanate is used as the crosslinking agent, it is preferably used in such an amount of as the number of isocyanate group becomes 1 to 1.5 times of the number of the active hydrogen groups in the end of the main chain of the organic compound.

Further, to complete rapidly the crosslinking reaction, there may be used catalysts such as organometallic catalysts, e.g., dibutyltin dilaurate (DBTDL), dibutyltin diacetate (DBTA), phenylmercury propionate, phenylmercury octenates; and amine catalysts, e.g., triethylenediamine, N,N'-dimethylpiperazine, N-methylmorpholine, tetramethylguanidine and triethylamine.

Furthermore, in the case of that the terminal group Y of the main chain is a polymerizable functional group, the polymerizable functional group is introduced to the end of the main chain of the polyether compound prepared by reacting a glycidyl ether or a glycidyl ether and ethylene oxide to an active hydrogen compound. The polymerizable functional groups include, for example, alkenyl groups such as vinyl group and the like; groups containing unsaturated bond such as acryloyl group, methacryloyl group and the like; and groups having straight chain and cyclic portion containing Si. These groups are introduced in the molecules by reacting the above polyether compound with a compound containing a polymerizable functional group.

As the compounds containing a polymerizable functional group, there are exemplified the following compounds; a compound having a carboxyl group and an unsaturated bond in one molecule such as acrylic acid, methacrylic acid, cinnamic acid, maleic acid, fumaric acid, itaconic acid and p-vinyl benzoic acid; and/or an anhydrides of the above compounds such as maleic anhydride and itaconic anhydride; and/or an acid chloride of the above compounds; glycidyls such as allyl glycidyl ether and glycidyl methacrylate; isocyanates such as methacryloyl isocyanate; and Si-containing compounds such as dichlorosilane and dimethylvinylchlorosilane.

These organic compounds are crosslinked by polymerization reaction. The polymerization (crosslinking) reaction is carried out by using light, heat or radioactive ray. If necessary, a polymerization initiator and/or a sensitizer may be used.

The ionic compounds for doping the organic polymers thus prepared include, for example, inorganic ionic salts containing at least one metal element selected from the group consisting of Li, Na, K, Cs, Ag, Cu and Mg, such as LiI, LiCl, LiClO$_4$, LiSCN, LiBF$_4$, LiAsF$_6$, LiCF$_3$SO$_3$, LiCF$_3$CO$_2$, LiHgI$_3$, NaI, NaSCN, NaBr, KI, CsSCN, AgNO$_3$ and CuC$_{12}$Mg(ClO$_4$)$_2$; quaternary ammonium salts such as (CH$_3$)$_4$NBF$_4$, (CH$_3$)NBr, (C$_2$H$_5$)NClO$_4$, (C$_2$H$_5$)NI, (C$_3$H$_7$)NBr, (n-C$_4$H$_9$)ClO$_4$, (n-C$_4$H$_9$)$_4$NI and (n-C$_5$H$_4$)$_4$NI; and organic ionic salts such as lithium stearylsulfonate, sodium octylsulfonate, lithium dodecylbenzenesulfonate, sodium naphthalenesulfonate, lithium dibutylnaphthalenesulfonate, potassium octylnaphthalenesulfonate and potassium dodecylnaphthalenesulfonate. These ionic compounds may be used in combination of at least two.

The ratio of the ionic compound added is preferably 0.01 to 100 parts by weight, more preferably 0.5 to 50 parts by weight, of the ionic compound per 100 parts by weight of said organic compound. When the ratio of the ionic compound added is too high, the excess of the ionic compound such as inorganic ionic salt does not dissociate and is present merely as a mixture and lowers the ionic conductivity adversely.

The methods for doping the ionic compound is not especially restricted. For example, there may be used a method in which the ionic compound is dissolved in an organic solvent such as methylethylketone (MEK) and tetrahydrofuran (THF) and mixed with the organic compound uniformly and then the organic solvent is removed under reduced pressure.

In the present invention, a substance which can dissolve the ionic compound contained in the organic polymer may be added to the solid electrolyte. By adding such a substance, the conductivity can be remarkably improved with no change in the base structure of the organic polymer.

The substances which can dissolve the ionic compound include, for example, tetrahydrofuran, 2-methyltetrahydrofuran, 1,3-dioxolane, 4,4-dimethyl-1,3-dioxolane, γ-butyrolactone, ethylene carbonate, propylene carbonate, butylene carbonate, sulfolane, 3-methylsulfolane, tert-butyl ether, iso-butyl ether, 1,2-dimethoxy ethane, 1,2-ethoxymethoxy ethane, ethylene glycol diethyl ether, water and the mixture thereof. They are not restricted to the above. The ratio of the compound added and the method for the addition are not particularly limited.

Thus, the galvanic cells according to the present invention comprising a solid electrolyte prepared by adding a substance which can dissolve an ionic compound into an organic polymer include, for example, galvanic cells of alkali metal type such as lithium cell, potassium cell and sodium cell; halogenate cells such as zinc-silver chloride cell, magnesium-silver chloride cell and magnesium-copper chloride cell; and proton conductive cells such as nickel-hydrogen cell.

Especially, lithium cell is suitable for applying a solid electrolyte as the conductivity of lithium ion is high in the solid electrolyte at high voltage and high energy.

Now, the lithium cell will be illustrated as a typical example of the cell according to the present invention.

Generally, the lithium cell is constituted by a positive electrode, a negative electrode and a separator as mentioned above. As the electrode active materials used for the positive electrode and the negative electrode, there are exemplified the following materials:

The positive electrode active materials include, for example, group I metal compounds such as $CuO$, $Cu_2O$ $Ag_2O$, $CuS$ and $CuSO_4$; group IV metal compounds such as $TiS_2$, $ZrO_2$, $SiO_2$, $SnO$ and $PbO$; group V metal compounds such as $V_2O_5$, $V_6O_{13}$, $VO_x$, $Nb_2O_5$, $Bi_2O_3$ and $Sb_2O_3$; group VI metal compounds such as $CrO_3$, $Cr_2O_3$, $MoO_3$, $MoS_2$, $WO_3$, $SeO_2$ and $TeO_2$; group VII metal compounds such as $MnO_2$ and $Mn_2O_3$; group VIII metal compounds such as $Fe_2O_3$, $FeO$, $Fe_3O_4$, $Ni_2O_3$, $NiO$, $NiPS_3$, $CoO_3$ and $CoO$; and metal compounds of the general formula $Li_xMY_y$ and $Li_xMN_yX_2$ (where M and N are respectively metals of groups I to VII, X is a chalcogen compound such as oxygen and sulfur); conductive high polymer compounds such as polypyrrole, polyaniline, polyparaphenylene, polyacetylene and polyacene materials; and carboneous materials of pseudo-graphite structure.

The negative electrode active materials include, for example, metal lithium; and alloys such as lithium-aluminum, lithium-lead, lithium-tin, lithium-aluminum-tin and Wood's metal. The materials used as the above-mentioned positive electrode active materials can be also used.

As the positive electrode of a lithium cell, a product in which the above-mentioned active material is bound by a solid electrolyte to a sheet is generally used. In this case, if required, a conductive material such as a carbon powder, e.g., acetylene black, or a metal powder can be mixed in the positive electrode to improve the electronic conductivity. In the preparation of the positive electrode sheet as mentioned above, several dispersing media and dispersants can be added to give an uniform dispersion system. As the other methods for the preparation of a positive electrode, there are included methods of preparing a thin film such as CVD, deposition, sputtering and aerosol deposition and a method in which a substance other than a solid electrolyte, such as polytetrafluoroethylene, is used as the binder. In these cases, a solid electrolyte can be also used in combination.

On the other hand, the negative electrode is made of pure lithium or lithium alloy sheet in many cases and the same method as the above-mentioned method for the preparation of the positive electrode may be also used.

The separator can be prepared alone into a sheet and arranged between the positive electrode and the negative electrode or alternately made to be a composite by applying the solid electrolyte solution on the positive electrode or the negative electrode. Furthermore, a porous material such as nonwoven polypropylene fabric and polyolefine fine pore membrane can be used as other separator materials. In this case, either a liquid electrolyte or a solid electrolyte may be present in the porous material. As the method for making to be a composite, the solution of the positive electrode or the negative electrode composition can be applied on the solid electrolyte sheet or the porous material and the method is not especially restricted.

Although the present invention is characterized in using an organic solid electrolyte, an inorganic solid electrolyte can be used in combination.

The present invention uses an organic polymer comprising a monomer having a specific structure and the organic polymer structure is made amorphous and further it has a side chain of the same structure as the main chain and hence the crystallization temperature becomes lower and, when an ionic compound such as a lithium salt is added, it makes the movement of lithium ion easy and, as the result, the lithium ion conductivity at a temperature not higher than room temperature is improved to give a galvanic cell excellent in low temperature characteristics and stable in quality. Furthermore, as the organic polymer is thermosetting, various shapes can be formed and it can be prepared to a film having excellent adhesion to the surface of the electrodes to give various cells of practical utility.

PREFERRED EMBODIMENTS OF THE INVENTION

The following examples serve to illustrate the invention in more detail although the invention is not limited to the examples.

EXAMPLE 1

1 part by weight of lithium perchlorate and 0.05 part by weight of azobisisobutyronitrile were dissolved in 10 parts by weight of an organic compound having an average molecular weight of 5,000 (calculated from its hydroxyl number) and a structure of the general formula (I) in which n: 2
m: 9
R: —$CH_3$
Y: —$OCCH=CH_2$
K: 3.

The resultant solution was mixed with a 85:15 mixture of manganese dioxide and acetylene black in a ratio of 1:1 to obtain a positive electrode composite for lithium cell. The composite was cast-coated on a stainless steel substrate and allowed to stand at 100° C. for 1 hour under an inert atmosphere to cure it. The thickness of the film formed on the stainless steel substrate was 30 $\mu m$.

Then, in order to form an electrolyte film on the above positive electrode composite, 1 part by weight of lithium perchlorate and 0.05 part by weight of azobisisobutyronitrile were dissolved in 10 parts by weight of the above organic compound and the solution was cast-coated on the above positive electrode composite and cured in the same method as above. The thickness of the electrolyte film thus formed was 20 μm.

Figure 1:
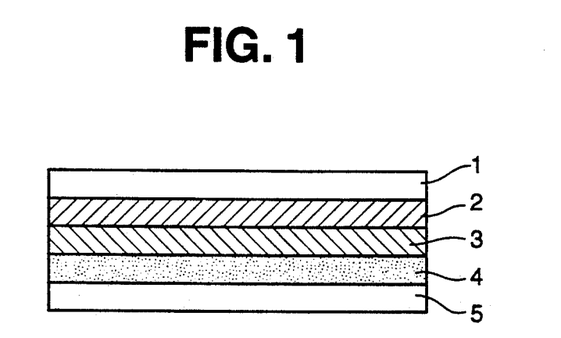
FIG. 1 shows the constitution of a cell for evaluation of a galvanic cell used in the Example.

Thus prepared composite sheet comprising stainless steel/positive electrode composite/electrolyte was cut into 1 cm × 1 cm and lithium was attached to the above electrolyte film as a negative electrode to prepare a cell comprising stainless steel (1)/positive electrode composite (2)/electrolyte (3)/negative electrode (4)/stainless steel (5) as shown in FIG. 1 and a load of 1 kg/cm$^2$ was applied on it and continuous constant current tests for 1 μA/cm$^2$ and 10 μA/cm$^2$ were performed at 5° C. As the result, positive electrode utilities of 86% and 16% were observed respectively.

Then, the same cell was stored at 80° C. for 30 days and then the temperature was restored to 5° C. and it was discharged at 1 μA/cm$^2$ and 10 μA/cm$^2$ in a same manner as above. Positive electrode utilities of 80% and 15% were observed respectively and substantially no change in capacity was observed by the storage.

Figure 2:
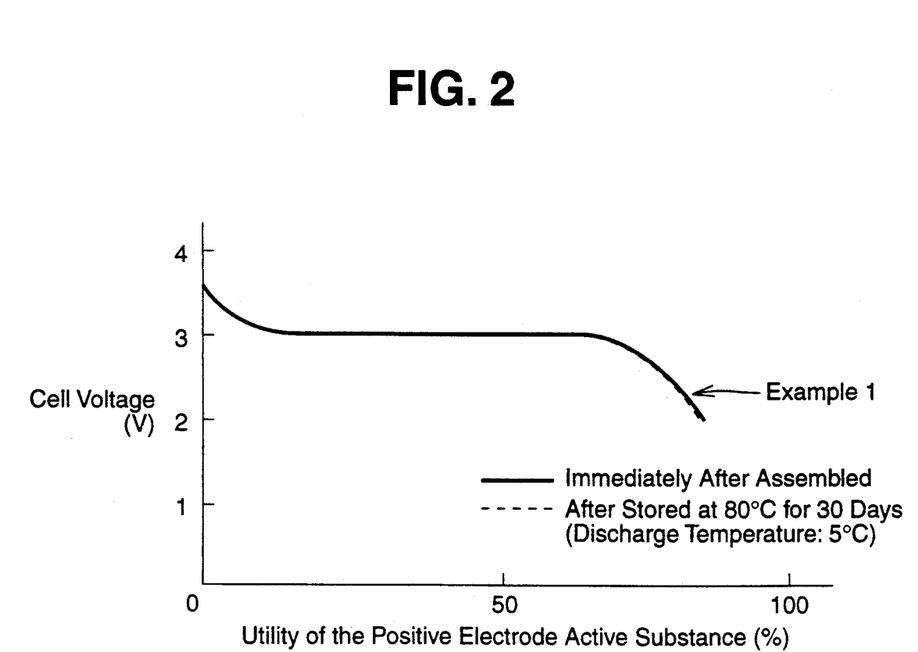
FIG. 2 is a diagram showing a discharge curve of the cell of Example 1 at 1 $\mu A/cm^2$.
Figure 3:
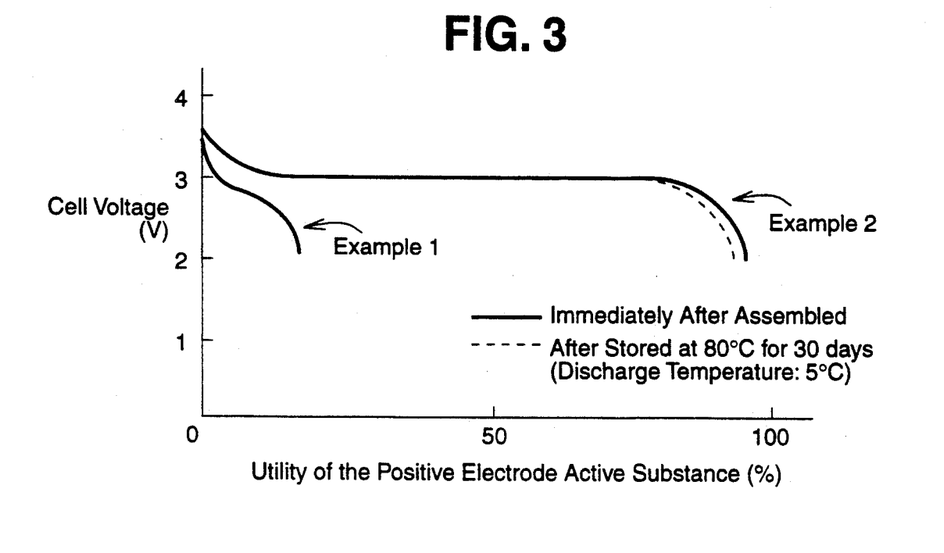
FIG. 3 is diagrams showing discharge curves of the cells of Examples 1 and 2 at 10 $\mu A/cm^2$.

The discharge curves obtained by the above continuous constant current tests are shown in FIGS. 2 and 3.

EXAMPLE 2

1 part by weight of lithium perchlorate and 0.05 part by weight of azobisisobutyronitrile were dissolved in 10 parts by weight of the same organic compound as in Example 1 and 40 parts by weight of propylene carbonate were with a 85:15 mixture of manganese dioxide and acetylene black in a ratio of 1:1 to obtain a positive electrode composite for lithium cell. The composite was cast-coated on a stainless steel substrate and allowed to stand at 100° C. for 1 hour under an inert atmosphere to cure it. The thickness of the film formed on the stainless steel substrate was 30 μm.

Then, in order to form an electrolyte film on the positive electrode composite, 1 part by weight of lithium perchlorate and 0.05 part by weight of azobisisobutyronitrile were dissolved in 10 parts by weight of the above organic compound and 40 parts by weight of propylene carbonate were mixed to it and the mixture was cast-coated on the positive electrode composite and cured in the same manner as above. The thickness of the electrolyte film thus formed was 20 μm.

Thus prepared composite sheet comprising stainless steel/positive electrode composite/electrolyte was cut into 1 cm × 1 cm and lithium lithium was attached to the above electrolyte film as a negative electrode to prepare a cell and a load of 1 kg/cm$^2$ was applied on it and continuous constant current tests for 10 μA/cm$^2$ and 100 μA/cm$^2$ were performed at 5° C. As the result, positive electrode utilities of 97% and 92% were observed respectively.

In this Example, as the conductivity of the electrolyte could be increased by the addition of propylene carbonate, a sufficient discharge capacity was attained even if the discharge was carried out at a current density of 10 to 100 times of Example 1.

Then, the same cell was stored at 80° C. for 30 days and then the temperature was restored to 5° C. and it was discharged at 10 μA/cm$^2$ and 100 μA/cm$^2$ in a same manner as above. Positive electrode utilities of 96% and 90% were observed respectively and substantially no change in capacity was observed by the storage.

The discharge curve (10 μA/cm$^2$) obtained by this Example is shown in FIG. 3.

EXAMPLES 3 TO 9

Electric cells were prepared in the same manner as in Example 2 by using the organic compounds shown in Table 1 in place of the above-mentioned organic compound and discharged at 5° C. and 100 μA/cm$^2$ to examine their initial positive electrode utilities and then stored at 80° C. for 30 days and then discharged at 5° C. and 100 μA to examine their positive electrode utilities. The results are shown in Table 1.

In these Examples by using the organic compounds according to the present invention, both the initial discharge capacities and the storage characteristics were good.

EXAMPLE 10

1 part by weight of lithium trifluoromethanesulfonate and 0.05 part by weight of azobisisobutyronitrile were dissolved in 10 parts by weight of the same organic compound as in Example 1 and 40 parts by weight of γ-butyrolactone were mixed to it and the mixture was mixed with a 85:15 mixture of manganese dioxide and acetylene black in a ratio of 1:1 to obtain a positive electrode composite for lithium cell. The composite was cast-coated on a stainless steel substrate and allowed to stand at 100° C. for 1 hour under an inert atmosphere to cure it. The thickness of the film formed on the stainless steel substrate was 30 μm.

Then, in order to form an electrolyte film on said positive electrode composite, 1 part by weight of lithium trifluoromethanesulfonate and 0.05 part by weight of azobisisobutyronitrile were dissolved in 10 parts by weight of the above organic compound and 40 parts by weight of γ-butyrolactone were mixed to it and the mixture was cast-coated on the positive electrode composite and cured in the same manner as above. The thickness of the electrolyte film thus formed was 20 μm.

Thus prepared composite sheet comprising stainless steel/positive electrode composite/electrolyte was cut into 1 cm × 1 cm and lithium was attached to the above electrolyte film as a negative electrode to prepare a cell and a load of 1 kg/cm$^2$ was applied on it and continuous constant current tests for 10 μA/cm$^2$ and 100 μA/cm$^2$ were performed at 5° C. As the result, positive electrode utilities of 97% and 94% were observed respectively.

Then, the same cell was stored at 80° C. for 30 days and then the temperature was restored to 5° C. and it was discharged at 10 μA/cm$^2$ and 100 μA/cm$^2$ in a same manner as above. Positive electrode utilities of 96% and 92% were observed respectively and substantially no change in capacity was observed by the storage.

EXAMPLE 11

Polypyrrole was formed on a platinum plate as a positive electrode for lithium cell by electrolytic polymerization. The amount of polypyrrole was 1.4 mg per cm$^2$ of the electrode area.

Then, in order to form an electrolyte film on said positive electrode, 1 part by weight of lithium perchlorate and 0.05 part by weight of azobisisobutyronitrile were dissolved in 10 parts by weight of the same organic compound as in Example 1 and 40 parts by weight of propylene carbonate were mixed to it and the mixture was cast-coated on the positive electrode composite and cured at 100° C. for 1 hour under inert atmosphere. The thickness of the electrolyte film thus formed was 20 μm.

Thus prepared composite sheet comprising platinum/positive electrode/electrolyte was cut into 1 cm×1 cm and lithium was attached to the above electrolyte film as a negative electrode to prepare a cell and a load of 1 kg/cm$^2$ was applied on it and a continuous constant current discharge test for 10 μA/cm$^2$ in the range of 2 V to 4 V was performed at 5° C. As the result, the initial discharge capacity was 0.1 mAh and no high decrease in capacity was observed thereafter to show good cycle characteristics.

Thus, decrease in capacity due to the formation of dendrite of the negative electrode lithium as assumed in the usual non-aqueous electrolyte liquid system was not observed in the Examples according to the present invention in which a solid electrolyte was used. It can be thought that the use of a solid electrolyte contributes to prevent growth of lithium dendrite in the electrolyte bulk.

Figure 4:
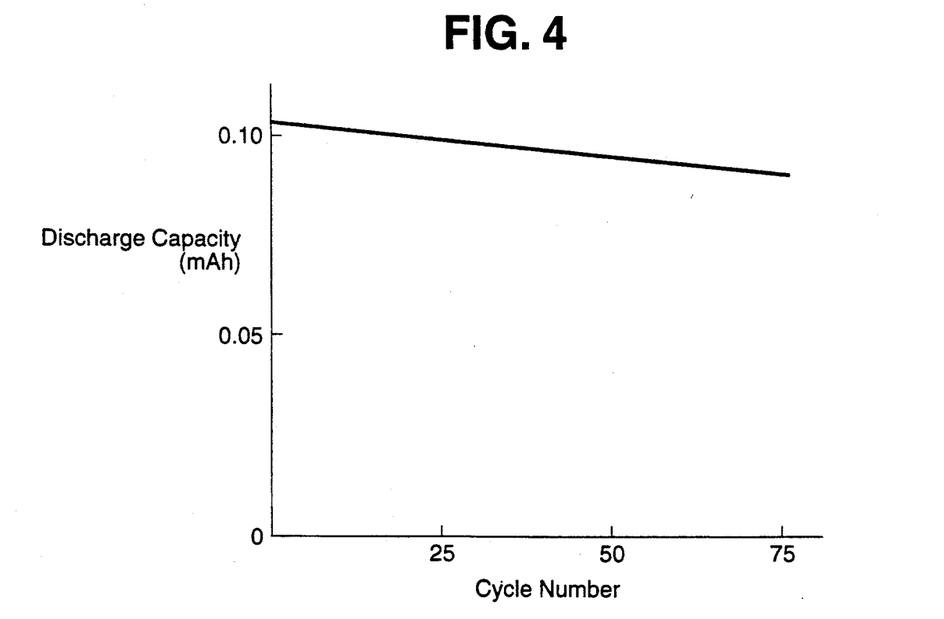
FIG. 4 is a diagram showing the result of the continuous constant current discharge test in Example 4.

The result of the continuous constant current discharge cycle test is shown in FIG. 4.

TABLE 1

| Example | Starting group Z, k | Unit constitution R, n, m, p | End group Y | Polymer network Arrangement of E | Utility (%) 1 | Utility (%) 2 |
|---|---|---|---|---|---|---|
| 3 | Z: $CH_2-CH-CH-CH-CH-CH_2$ with O's below each, k: 6 | R: $-CH_3$<br>n: 2<br>m: 9 | Y: $-OCC(CH_3)=CH_2$ | $-A_m-$ | 92 | 91 |
| 4 | Z: $CH_2-CH-CH_2$ with O's, k: 3 | R: $-CH_3$<br>n: 6<br>m: 14<br>p: 5 | Y: $-OCCH=CH_2$ | $-A_m-(CH_2CH_2O)_p-$ | 92 | 90 |
| 5 | Z: $CH_2-CH_2-O-$, $-N-$, k: 3 | R: phenyl<br>n: 3<br>m: 7 | Y: $-OCH=CH_2$ | $-A_m-$ | 94 | 93 |
| 6 | Z: bisphenol-type structure with two phenyl rings connected by $C(CH_3)_2$ and $-O-$ linkages, k: 2 | R: $-CH_3$<br>n: 12<br>m: 10 | Y: $-OC(C_6H_4)CH=CH_2$ | $-A_m-$ | 94 | 92 |
| 7 | Z: piperazine-like ring with $CH_2-N$ and $CH_2-N$, k: 4 | R: phenyl<br>n: 6<br>m: 5<br>p: 3 | Y: $-OCCH=CH_2$ | $-(CH_2CH_2O)_p-A_m-$ | 93 | 92 |
| 8 | Z: $-O-CH_2-CH_2-O-$, k: 2 | R: $-CH_2-CH_2-CH_2-CH_3$<br>n: 3<br>m: 3<br>p: 7 | Y: $-OC(C_6H_4)CH=CH_2$ | $-(CH_2CH_2O)_{p-a}-A_m-(CH_2CH_2O)_a$ | 91 | 90 |
| 9 | Z: $-N-(CH_2-CH_2-N)_5-$, k: 8 | R: $-CH_3$<br>n: 3<br>m: 8 | Y: $-OCC(CH_3)=CH_2$ | $-A_m-$ | 95 | 90 |

Note:
The utility (%) of 1 shows the initial value.
The utility (%) of 2 shows the value after storring at 80° C. for 30 days.

What is claimed is:

1. A galvanic cell in which at least one of the negative electrode, the positive electrode and the separator comprises a solid electrolyte prepared by doping an ionic compound to an organic polymer, characterized in that said organic polymer is a polymer obtained by crosslinking an organic compound having a structure of the general formula (I):

$$Z\text{-}[E\text{-}Y]_k \qquad (I)$$

where Z is a residue of a compound containing at least one active hydrogen, Y is an active hydrogen or a polymerizable functional group, E is expressed by $-(A)_m-$ or a block-copolymeric type group of the above A and $-(CH_2-CH-O)-$ in which the total sum of A is m and the total sum of $-(CH_2-CH-O)-$ is p, m is an integer of 1 to 250, p is an integer of 1 to 450, k is an integer of 1 to 12, and A is a group represented by the general formula (II):

$$\begin{array}{c}-(CH_2-CH-O)-\\ |\\ CH_2-O-(CH_2-CH_2-O)_nR\end{array} \qquad (II)$$

where n is an integer of 1 to 25 and R is an alkyl group having 1 to 20 carbon atoms, an alkenyl group, an aryl group or an alkylaryl group.

2. A galvanic cell according to claim 1, in which the average molecular weight of said organic compound is not higher than 20,000.

3. A galvanic cell according to claim 1, in which said solid electrolyte contains a substance which can dissolve the ionic compound.

4. A galvanic cell according to claim 1, in which said organic polymer is one prepared by crosslinking said organic compound wherein Y is active hydrogen by using a crosslinking agent.

5. A galvanic cell according to claim 1, in which said organic polymer is one prepared by polymerizing said organic compound wherein Y is a polymerizable functional group and crosslinking the polymerized product.

6. A galvanic cell according to claim 1, in which said ionic compound is a lithium compound.

7. A galvanic cell according to claim 1, in which said galvanic cell is a lithium cell.

* * * * *

UNITED STATES PATENT AND TRADEMARK OFFICE
CERTIFICATE OF CORRECTION

PATENT NO. : 5,268,243
DATED : December 7, 1993
INVENTOR(S) : Tomohiko Noda, et al.

It is certified that error appears in the above-indentified patent and that said Letters Patent is hereby corrected as shown below:

At Column 1, lines 66 and line 67, delete the formula "-(CH$_2$-CH-O)-" and insert the formula -- -(CH$_2$-CH$_2$-O)- --;

At Column 13, lines 14 and line 15, delete the formula "-(CH$_2$-CH-O)-" and insert the formula -- -(CH$_2$-CH$_2$-O)- --;

In the Abstract, lines 12 and line 13, delete the formula "-(CH$_2$-CH-O)-" and insert the formula -- -(CH$_2$-CH$_2$-O)- --;

Signed and Sealed this

Fifth Day of November, 1996

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO.  : 5,268,243
DATED       : Dec. 7, 1993
INVENTOR(S) : Tomohiko Noda, et al It is certified that error appears in the above-identified patent and that said Letters Patent is hereby corrected as shown below:

Cover Page of Patent:

[73]   Assignee:   Dai-Ichi Kogyo Seiyaku Co., Ltd., Kyoto, Japan and

Yuasa Corporation, Osaka, Japan

Signed and Sealed this

Seventh Day of September, 1999

*Attest:*

Q. TODD DICKINSON

*Attesting Officer*    *Acting Commissioner of Patents and Trademarks*